United States Patent
Shih et al.

(10) Patent No.: US 11,201,512 B2
(45) Date of Patent: Dec. 14, 2021

(54) ROTOR ASSEMBLY AND MOTOR USING SAME

(71) Applicant: Delta Electronics, Inc., Taoyuan (TW)

(72) Inventors: Chien-Chung Shih, Taoyuan (TW); Hsiang-Chun Chen, Taoyuan (TW); Hsiang-Yun Hsiao, Taoyuan (TW); Chia-Hsiang Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 103 days.

(21) Appl. No.: 16/697,931

(22) Filed: Nov. 27, 2019

(65) Prior Publication Data

US 2021/0028661 A1 Jan. 28, 2021

Related U.S. Application Data

(60) Provisional application No. 62/877,633, filed on Jul. 23, 2019.

(51) Int. Cl.
*H02K 1/27* (2006.01)

(52) U.S. Cl.
CPC .................................. *H02K 1/276* (2013.01)

(58) Field of Classification Search
CPC .... H02K 1/276; H02K 29/03; H02K 2201/03; H02K 2213/03; H02K 1/2706; H02K 1/28
See application file for complete search history.

(56) References Cited

U.S. PATENT DOCUMENTS

| | | | |
|---|---|---|---|
| 6,794,784 B2 * | 9/2004 | Takahashi | H02K 1/246 310/156.56 |
| 8,405,271 B2 * | 3/2013 | Lee | H02K 29/03 310/156.57 |
| 2009/0184597 A1 * | 7/2009 | Lee | H02K 1/276 310/156.56 |

(Continued)

FOREIGN PATENT DOCUMENTS

| | | |
|---|---|---|
| CN | 101043157 A | 9/2007 |
| CN | 101494411 A | 7/2009 |

(Continued)

*Primary Examiner* — Thomas Truong
(74) *Attorney, Agent, or Firm* — Kirton McConkie; Evan R. Witt

(57) ABSTRACT

A rotor assembly for a motor is disclosed. The motor has a minimum air gap width value. The rotor assembly includes magnets, a main-body portion, magnet-receiving slots and arc-trimming portions. Each of the magnet-receiving slots is disposed around a central axis of the main-body portion and locates through the main-body portion for accommodating the corresponding magnet therein. The magnet-receiving slot has a slot width value. The arc-trimming portions spatially correspond to the magnet-receiving slots. Each of the arc-trimming portions and a geometric symmetry center of the corresponding magnet-receiving slot together form an arc-trimming depth value. The arc-trimming depth value is greater than a sum value of a rate constant multiplied by the slot width value and then subtracted 2 times of the minimum air gap width value, and is less than the sum value of the rate constant multiplied by the slot width value and then plus 2 times of the minimum air gap width value.

20 Claims, 8 Drawing Sheets

(56) References Cited

U.S. PATENT DOCUMENTS

| | | | |
|---|---|---|---|
| 2010/0194228 A1 | 8/2010 | Lee et al. | |
| 2013/0106228 A1* | 5/2013 | Aoyama | H02K 29/03 310/156.53 |
| 2016/0285326 A1 | 9/2016 | Kawamura et al. | |

FOREIGN PATENT DOCUMENTS

| | | |
|---|---|---|
| CN | 102214958 A | 10/2011 |
| CN | 203691092 U | 7/2014 |
| CN | 204179780 U | 2/2015 |
| CN | 204886463 U | 12/2015 |
| CN | 110022044 A | 7/2019 |
| JP | 2014093852 A | 5/2014 |
| TW | M408188 U | 7/2011 |

* cited by examiner

ROTOR ASSEMBLY AND MOTOR USING SAME

CROSS-REFERENCE TO RELATED APPLICATION

This application claims the benefit of U.S. Provisional Application Ser. No. 62/877,633 filed on Jul. 23, 2019, the entire content of which is incorporated herein by reference for all purposes.

FIELD OF THE INVENTION

The present disclosure relates to a motor, and more particularly to a rotor assembly and a motor using the same.

BACKGROUND OF THE INVENTION

Generally, a permanent magnet electric machine or a permanent magnetic motor includes a rotor and a stator. The stator includes a winding disposed thereon. The rotor includes a permanent magnet disposed thereon. The rotor is formed by stacking a plurality of rotor laminations, such as but not limited to, silicon steel sheets. In that, the rotor is rotated by the magnetic force generated between the stator and the rotor.

In order to improve the efficiency or performance of the motor, it is necessary to increase the torque ratio generated by a unit current. The value of the torque ratio is called as Torque Constant (denoted as KT), which is often used to evaluate the efficiency or performance of the motor. When the motor has a larger torque constant KT, only a lower current is required under the same torque demand, which can effectively reduce the copper wire loss and improve the efficiency.

Mostly, a flower-petal-shaped rotor design is exploited in a conventional permanent magnet motor, which has a plurality of slots disposed around the outer diameter of the rotor to organize the magnetic flux, so as to achieve the effects of improving the motor torque or reducing the cogging torque. However, in case of designing a flower-petal-shaped rotor, and in order to ensure that the output torque performance (i.e., a larger torque) can be maintained under an optimal torque ripple condition (i.e., a smother operation), it is necessary to balance the arc depth of the arc portion, the disposing position of the magnet and the size of the rib. When the simulation analysis is utilized, due to a huge amount of variation factors, it takes a very long time to obtain the design value to balance the performance among many aspects. Moreover, the dimensional parameters for the rotor are affected with each other, and it results in increasing the difficulty of calculating the optimal size of the rotor.

Therefore, there is a need for providing a rotor assembly and a motor using the same to overcome the above drawbacks.

SUMMARY OF THE INVENTION

An object of the present disclosure is to provide a rotor assembly and a motor using the same. With the rotor assembly in optimized design, the torque ripple of the motor can be effectively suppressed, and the value of the torque ripple is reduced to less than 10%, so as to minimize the torque ripple in the maximum output torque range. Thus, the mutual influence of the leak flux of motor and the air-gap flux distribution/density is eliminated, and it achieves the effect of improving the efficiency of motor.

Another object of the present disclosure is to provide a rotor assembly and a motor using the same. Since the rotor assembly is designed in optimization, it is beneficial to suppress the torque ripple and ensure the rotor assembly to provide the optimized output torque performance. Moreover, when the output toque of the motor is improved, it allows to shorten the magnetic component thickness and reduce the input current value. Thus, the endurance of anti-demagnetization of the output torque of motor is improved, and it achieves the effect of improving the efficiency of motor.

A further object of the present disclosure is to provide a rotor assembly and a motor using the same. By optimizing the size and parameters of the rotor assembly, it simplifies the design and speeds up the development of products.

In accordance with an aspect of the present disclosure, a rotor assembly for a motor is disclosed. The rotor assembly is matched with a stator assembly. The rotor assembly and the stator assembly have a minimum air gap width value therebetween. The rotor assembly includes a plurality of magnets, a main-body portion, a plurality of magnet-receiving slots and a plurality of arc-trimming portions. The main-body has a center axis and an outer peripheral edge. The plurality of magnet-receiving slots spatially correspond to the plurality of magnets and accommodate the plurality of magnets therein. The plurality of magnet-receiving slots are disposed on the main-body portion around the central axis of the main-body portion and locate through the main-body portion. Each of the plurality of magnet-receiving slots accommodates the corresponding magnet therein. The magnet-receiving slot has a slot width value in an outward direction extending from the central axis. The plurality of arc-trimming portions are adjacent to the outer peripheral edge and spatially correspond to the plurality of magnet-receiving slots. Each of the plurality of arc-trimming portions and a geometric symmetry center of the corresponding magnet-receiving slot together form an arc-trimming depth value. An arc-trimming interval value is formed between the arc-trimming portion and an end of the corresponding magnet-receiving slot. The arc-trimming depth value is greater than a sum value of a rate constant multiplied by the slot width value and then subtracted 2 times of the minimum air gap width value, and is less than the sum value of the rate constant multiplied by the slot width value and then plus 2 times of the minimum air gap width value. The arc-trimming interval value is greater than 0.5 times of the minimum air gap width value and is less than 2 times of the minimum air gap width value.

In accordance with another aspect of the present disclosure, a motor is provided. The motor includes a stator assembly and a rotor assembly. The stator assembly includes a hollow portion. The rotor assembly is disposed within the hollow portion and matched with the stator assembly. The rotor assembly and the stator assembly have a minimum air gap width value therebetween. The rotor assembly includes a plurality of magnets, a main-body portion, a plurality of magnet-receiving slots and a plurality of arc-trimming portions. The main-body has a center axis and an outer peripheral edge. The plurality of magnet-receiving slots spatially correspond to the plurality of magnets and accommodate the plurality of magnets therein. The plurality of magnet-receiving slots are disposed on the main-body portion around the central axis of the main-body portion and locate through the main-body portion. Each of the plurality of magnet-receiving slots accommodates the corresponding magnet therein. The magnet-receiving slot has a slot width value in an outward direction extending from the central axis. The plurality of arc-trimming portions are adjacent to the outer peripheral edge and spatially correspond to the plurality of magnet-receiving slots. Each of the plurality of arc-trimming portions and a geometric symmetry center of the corresponding magnet-receiving slot together form an arc-trimming depth value. An arc-trimming interval value is formed between the arc-trimming portion and an end of the corresponding magnet-receiving slot. The arc-trimming depth value is greater than a sum value of a rate constant multiplied by the slot width value and then subtracted 2 times of the minimum air gap width value, and is less than the sum value of the rate constant multiplied by the slot width value and then plus 2 times of the minimum air gap width value. The arc-trimming interval value is greater than 0.5 times of the minimum air gap width value and is less than 2 times of the minimum air gap width value.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
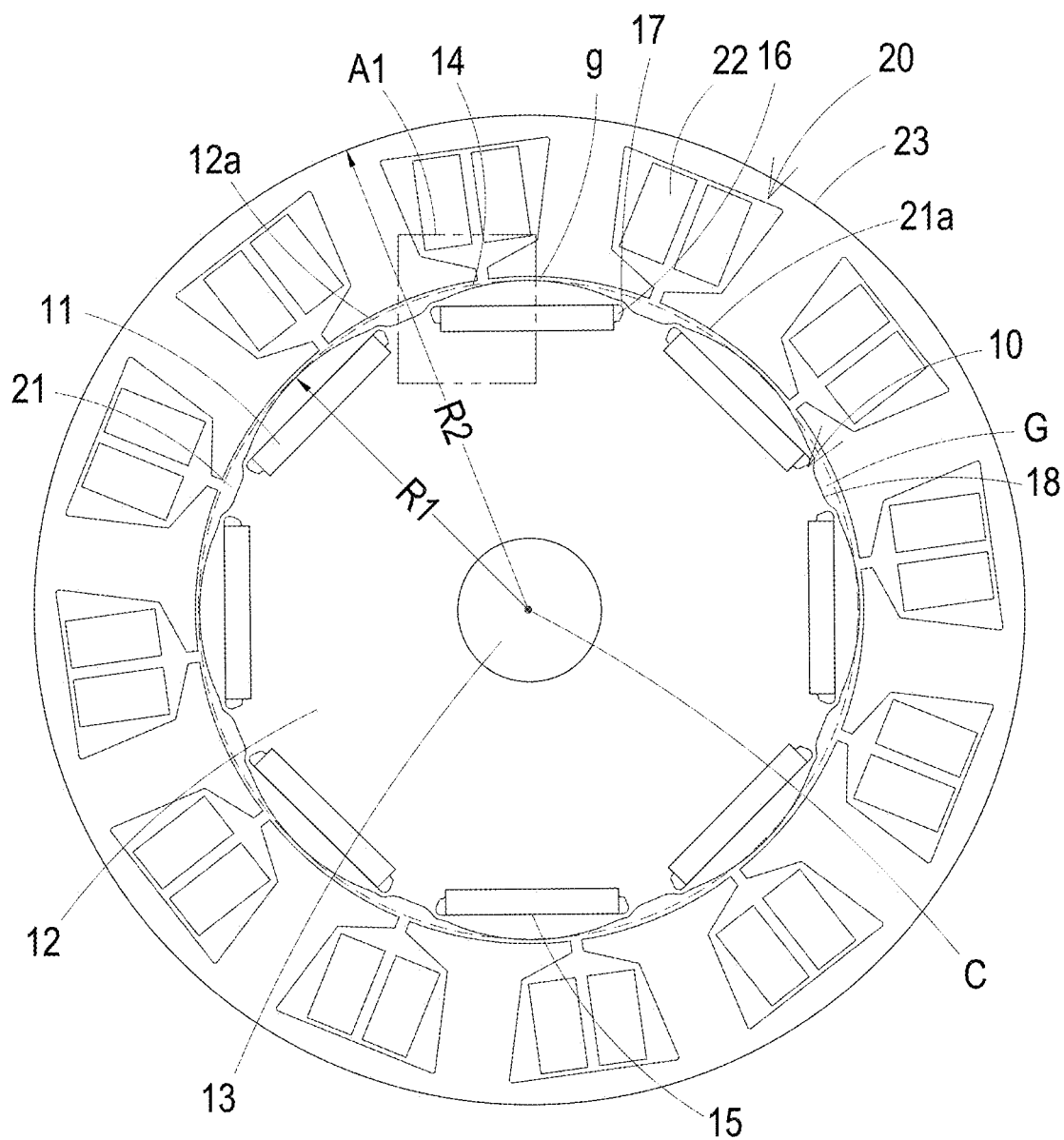
FIG. 1 is a sectional view illustrating a motor according to a preferred embodiment of the present disclosure.
Figure 2:
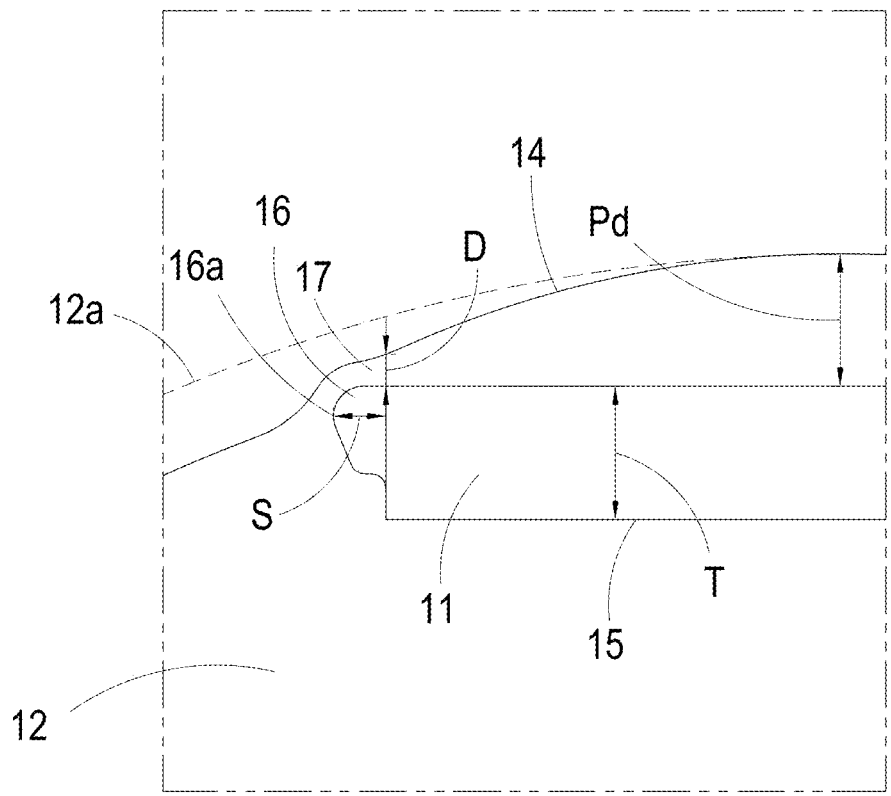
FIG. 2 is a partial enlarged view of area A1 shown in FIG. 1.
Figure 3:
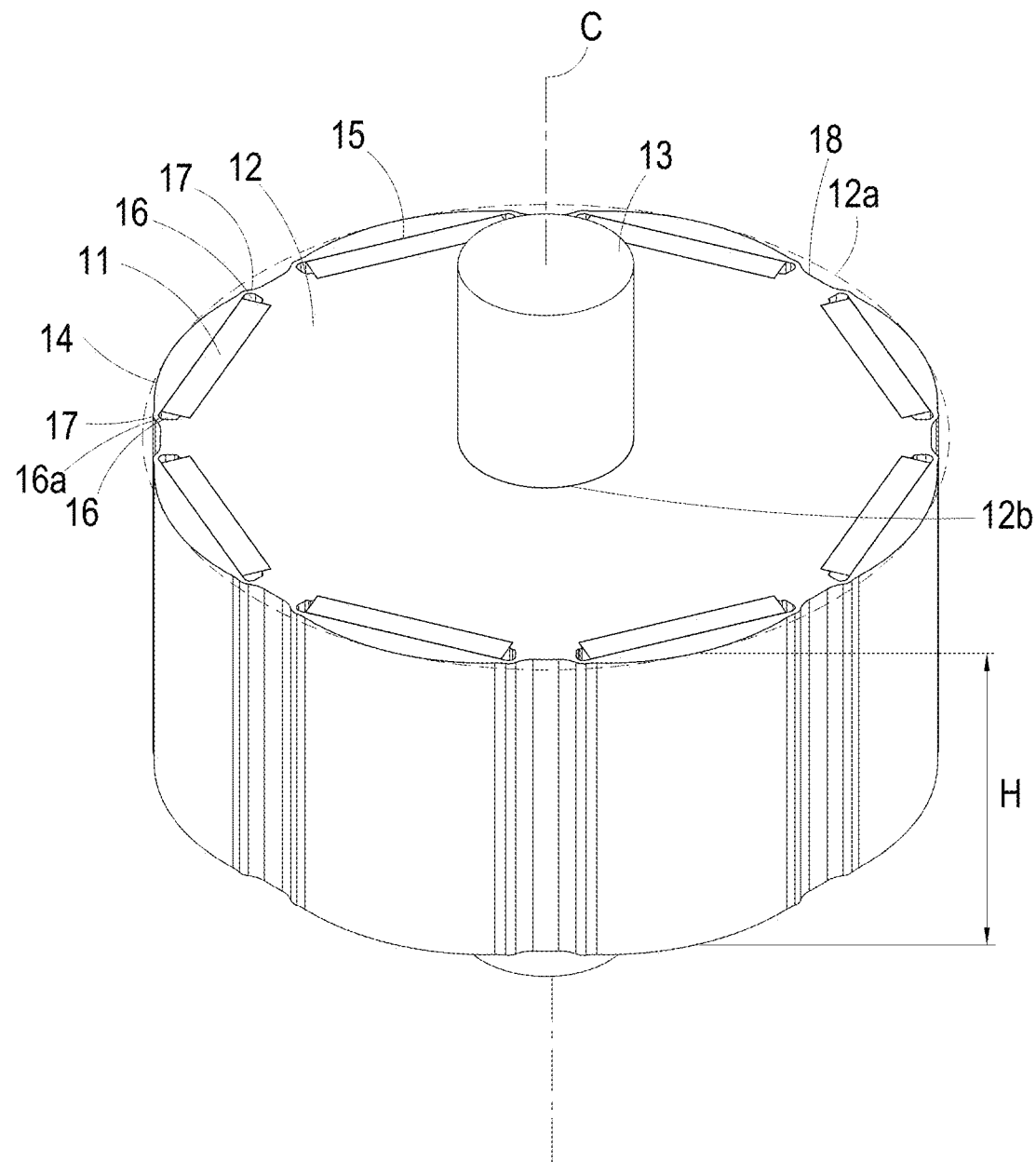
FIG. 3 is a perspective structural view illustrating the rotor assembly according to the preferred embodiment of the present disclosure.
Figure 4:
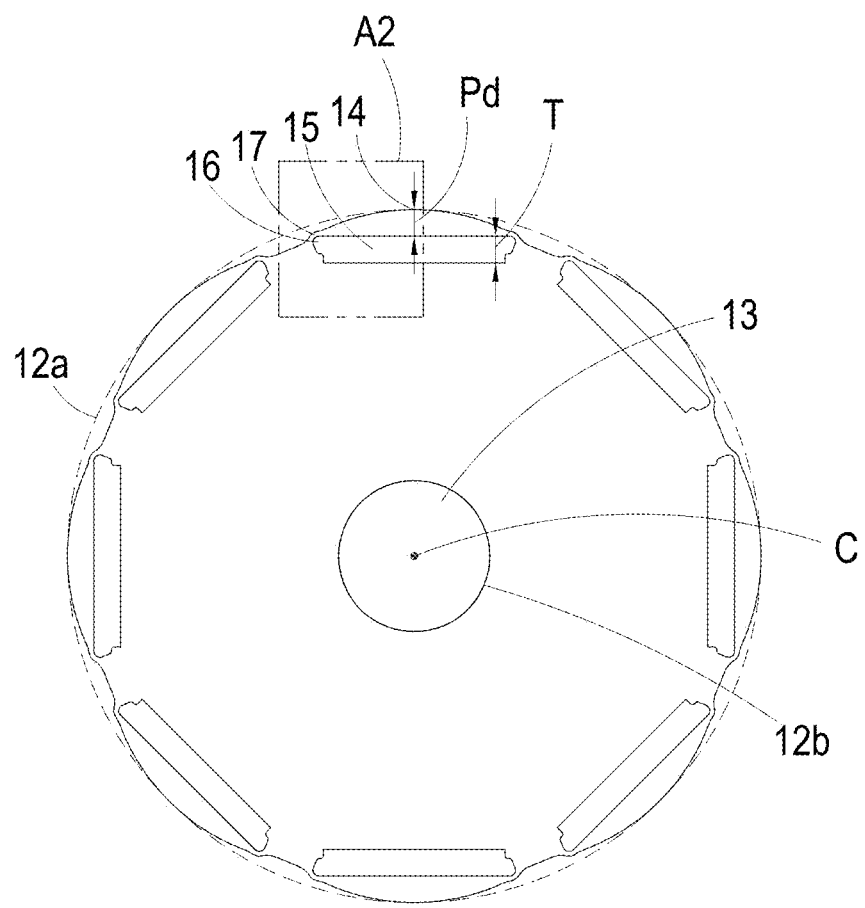
FIG. 4 is a top view illustrating the main body of the rotor assembly according to the preferred embodiment of the present disclosure.
Figure 5:
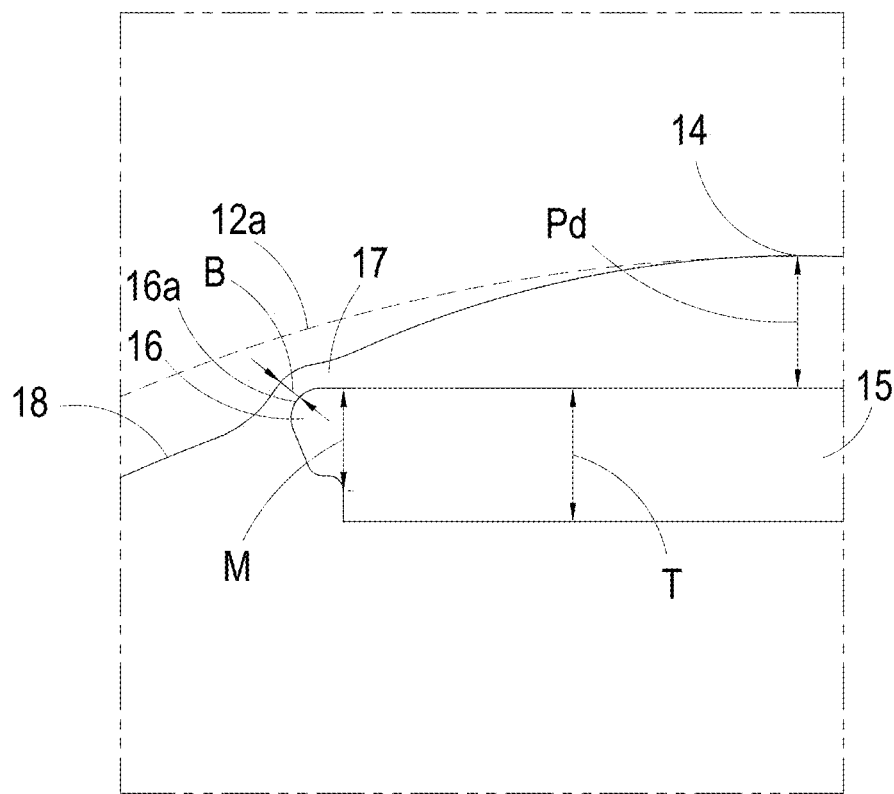
FIG. 5 is a partial enlarged view of area A2 shown in FIG. 4.

Please refer to FIGS. 1 to 5. FIG. 1 is a sectional view illustrating a motor according to a preferred embodiment of the present disclosure. FIG. 2 is a partial enlarged view of area A1 shown in FIG. 1. FIG. 3 is a perspective structural view illustrating the rotor assembly according to the preferred embodiment of the present disclosure. FIG. 4 is a top view illustrating the main body of the rotor assembly according to the preferred embodiment of the present disclosure. FIG. 5 is a partial enlarged view of area A2 shown in FIG. 4. In the embodiment, the motor 1 includes at least a rotor assembly 10 and a stator assembly 20. Preferably but not exclusively, the combination of the rotor assembly 10 and the stator assembly 20 is implemented by means of an outer stator and an inner rotor. The present disclosure is not limited thereto. In the embodiment, the stator assembly 20 includes a hollow portion 21 therein and a plurality of windings 22 disposed correspondingly on and between a plurality of teeth of the stator assembly 20. The rotor assembly 10 is received within the hollow portion 21 of the stator assembly 20. In the embodiment, the rotor assembly 10 and the stator assembly 20 of the motor 1 are assembled to form a minimum air gap width value g therebetween. Preferably but not exclusively, the minimum air gap width value g is ranged from 0.25 mm to 1.0 mm. The present disclosure is not limited thereto. In the embodiment, the rotor assembly 10 includes a plurality of magnets 11, a main-body portion 12, a plurality of magnet-receiving slots 15 and a plurality of arc-trimming portions 14. The main-body portion 12 includes a central axis C and an outer peripheral edge 12a. Preferably but not exclusively, the main-body portion 12 is formed by stacking a plurality of rotor laminations, which are made of, for example but not limited to, a silicon steel material sheet. Consequently, a stacked thickness H of the main-body portion 12 is formed in a direction of the central axis C. In the embodiment, the thicknesses of the plurality of magnet 11, the plurality of magnet-receiving slots 15 and the plurality of arc-trimming portions 14 in the direction of the central axis C are, for example, equal to the stacked thickness H of the main-body portion 12. Certainly, the stacked thickness H is adjustable and depends on need. The present disclosure is not limited thereto and not redundantly described herein. Preferably but not exclusively, the rotor assembly 10 includes a rotating shaft 13 passing through a hollow portion 12b (FIG. 3) of the main-body portion 12. The central axis C of the main-body portion 12 is aligned to a central axis (not numbered) of the rotating shaft 13, so that the central axis C of the main-body portion 12 is constructed as the rotary center of the rotor assembly 10. The rotor assembly 10 is driven by the rotating shaft 13 and substantially rotated about the central axis C. Furthermore, the central axis C of the main-body portion 12 can also be regarded as the symmetric center of the motor 1. In the embodiment, the rotor assembly 10 has a rotor outer diameter length R1, which is the radial distance from the central axis C of the main-body portion 12 to the outer peripheral edge 12a of the main-body portion 12. The stator assembly 20 has a stator outer diameter length R2, which is the radial distance from the central axis C of the main-body portion 12 to the outer peripheral edge 23 of the stator assembly 20. Preferably but not exclusively, a ratio of the rotor outer diameter length R1 to the stator outer diameter length R2 is ranged from 60% to 70%.

Moreover, in the embodiment, the plurality of magnet-receiving slots 15 spatially correspond to the plurality of magnets 11. The plurality of magnet-receiving slots 15 are symmetrically disposed on the main-body portion 12 around the central axis C and located through the main-body portion 12 near by the outer peripheral edge 12a. Each of the plurality of magnet-receiving slots 15 accommodates the corresponding magnet 11 therein. Furthermore, each of the plurality of magnet-receiving slots 15 has a slot width value T in an outward direction extending from the central axis C toward outside of the rotor assembly 10 (i.e., toward the outer peripheral edge 12a of the main-body portion 12). In the embodiment, the slot width value T is equal to or slightly greater than the thickness of the magnet 11, so that the magnet 11 is stably embedded in the corresponding magnet-receiving slot 15 without being detached. Preferably but not exclusively, the slot width value T is less than 15 times of the minimum air gap width value g, but the present disclosure is not limited thereto. In detail, the plurality of magnet-receiving slots 15 correspond to and accommodate the plurality of magnets 11 therein, respectively. Preferably but not exclusively, the plurality of magnets 11 are the bar-shaped permanent magnets. In the embodiment, the number of the plurality of magnet-receiving slots 15 is relative to the number of the plurality of magnets 11. Namely, the number of both are the same. For example, there are eight magnet-receiving slots 15 and eight magnets 11 correspondingly accommodated therein. Each of the plurality of magnet-receiving slots 15 accommodates the corresponding magnet 11 therein. In that, the eight magnet-receiving slots 15 and the eight magnets 11 corresponding thereto are paired in one-to-one manner, and disposed symmetrically around the central axis C of the main-body portion 12 at a central angle of about every 45 degrees. The present disclosure is not limited thereto. In other embodiments, the numbers of the magnet-receiving slots 15 and the magnets 11 can be, for example but not limited to four, six, ten or twelve. In other words, the number of the magnet-receiving slots 15 and the number of the magnets 11 in the present disclosure can be expressed as 2N, wherein N is an integer, and N is greater than or equal to 2. Thus, the rotor assembly 10 can be designed to provide 2N poles, which will not be redundantly described hereafter. In addition, the magnet-receiving slots 15 can also accommodate the magnets 11 in one-to-multi manner, but is not limited thereto.

In the embodiment, the plurality of arc-trimming portions 14 are adjacent to the outer peripheral edge 12a of the main-body portion 12, and spatially correspond to the plurality of magnet-receiving slots 15. Notably, each of the plurality of arc-trimming portions 14 and a geometric symmetry center of the corresponding magnet-receiving slot 15 together form an arc-trimming depth value Pd. In addition, an arc-trimming interval value D is formed between the arc-trimming portion 14 and an end of the corresponding magnet-receiving slot 15. In the embodiment, the arc-trimming depth value Pd is greater than a sum value of a rate constant K multiplied by the slot width value T and then subtracted 2 times of the minimum air gap width value g, and is less than the sum value of the rate constant K multiplied by the slot width value T and then plus 2 times of the minimum air gap width value g. The relationships of the arc-trimming depth value Pd, the rate constant K1, the slot width value T and the minimum air gap width value g can be expressed as the following equation (1).

$$K1 \times T - 2 \times g < Pd < K1 \times T + 2 \times g \qquad (1)$$

In the embodiment, the rate constant K1 is greater than 0 and is less than 0.25. In addition, the arc-trimming interval value D is greater than 0.5 times of the minimum air gap width value g and is less than 2 times of the minimum air gap width value g. The relationships of the arc-trimming interval value D and the minimum air gap width value g can be expressed as the following equation (2).

$$0.5 \times g < D < 2 \times g \qquad (2)$$

Table 1 shows the relationships of the output torques and torque ripples relative to different arc-trimming depth values Pd. In Table 1, the rate constant K1 is set as 0.145 and the minimum air gap width value g is set as 0.7 mm.

TABLE 1

| Arc-trimming depth values Pd (mm) | Torque ripples [%] |
| --- | --- |
| K1 × T + 2 g | 11.21 |
| K1 × T + g | 8.45 |

TABLE 1-continued

| Arc-trimming depth values Pd (mm) | Torque ripples [%] |
| --- | --- |
| K1 × T + 0.5 g | 5.81 |
| K1 × T − 0.5 g | 9.68 |
| K1 × T − 1 g | 16.33 |
| K1 × T − 2 g | 22.54 |

Figure 6:
FIG. 6 shows the relationships of torque ripples relative to different arc-trimming depth values.

FIG. 6 shows the relationships of torque ripples relative to different arc-trimming depth values. As shown in FIG. 6, while the rotor assembly 10 has the arc-trimming depth value Pd designed in the range of equation (1), and the arc-trimming interval value D designed in the ranged of equation (2), it tends to obtain and compromise a maximum output torque and a minimum torque ripple. Namely, as the arc-trimming depth value Pd is greater than a sum value of a rate constant K1 multiplied by the slot width value T and then subtracted 2 times of the minimum air gap width value g, and is less than the sum value of the rate constant K1 multiplied by the slot width value T and then plus 2 times of the minimum air gap width value g, and wherein the arc-trimming interval value D is greater than 0.5 times of the minimum air gap width value g, and is less than 2 times of the minimum air gap width value g, it is beneficial for the motor 1 to minimize the torque ripple in the maximum output torque range. Thus, the endurance of anti-demagnetization of the output torque of the motor 1 is improved, and it achieves the effect of improving the efficiency of the motor 1.

Furthermore, refer to FIGS. 4 and 5. In the embodiment, each of the plurality of magnet-receiving slots 15 includes two extending slots 16 disposed on two opposite ends of the corresponding magnet 11, respectively, and in communication with the corresponding magnet-receiving slot 15. In the embodiment, the extending slot 16 and the corresponding magnet-receiving slot 15 have a communication length M therebetween. Preferably but not exclusively, the communication length M is ranged from 0.6 times of the slot width value T to 0.8 times of the slot width value T. Thus, when the arrangement of the extending slots 16 is utilized to suppress the torque ripple, it is also ensured that the magnet 11 is stably embedded in the corresponding magnet-receiving slot 15 without being detached. The relationships of the communication length M and the slot width value T can be expressed as the following equation (3).

$$0.6 \times T < M < 0.8 \times T \qquad (3)$$

In the embodiment, each of the plurality of arc-trimming portions 14 includes two extending portions 17 disposed on two opposite ends of the corresponding arc-trimming portion 14. Each of the extending portions 17 extends along the outer peripheral edge 12a of the main-body portion 12, and spatially corresponds to each of the corresponding extending slots 16, respectively. Each of the extending portions 17 has a cross width value B. Preferably but not exclusively, the cross width value B is equal to the arc-trimming interval value D, which is greater than 0.5 times of the minimum air gap width value g, and is less than 2 times of the minimum air gap width value g. In the embodiment, the extending slot 16 has an inner edge 16a which is at least partially parallel to the corresponding extending portion 17. In the embodiment, the inner edge 16a of the extending slot 16 and the corresponding magnet 11 received within the corresponding magnet-receiving slot 15 have an interval width value S, as shown in FIG. 2. Preferably but not exclusively, the interval width value S is ranged from 0.3 times of the slot width value T to 0.5 times of the slot width value T. The relationships of interval width value S and the slot width value T can be expressed as the following equation (4).

$$0.3 \times T < S < 0.5 \times T \tag{4}$$

Furthermore, refer to FIGS. 1 to 5. In the embodiment, each two of adjacent arc-trimming portions 14 have a recess portion 18, and a maximum air gap width value G is formed between the recess portion 18 and the inner annular wall 21a of the stator assembly 20, wherein the maximum air gap width value G is ranged from 3 times of the minimum air gap width value g to 5 times of the minimum air gap width value g. Thus, the rotor assembly 10 of the motor 1 is designed in optimization. The mutual influence of the leak flux of the motor 1 and the air-gap flux distribution/density is eliminated, and it achieves the effect of improving the efficiency of the motor 1. In addition, by optimizing the size and parameters of the rotor assembly 10, it simplifies the design and speeds up the development of products.

Figure 7:
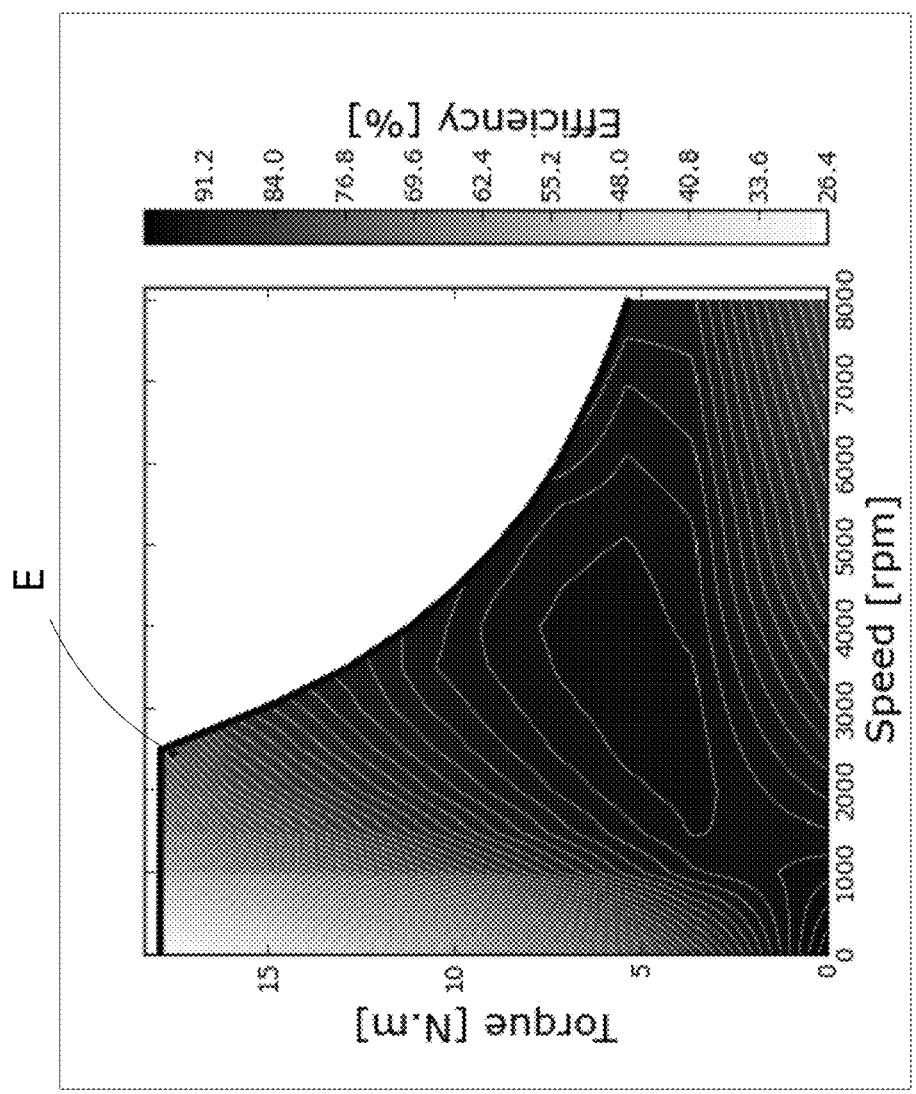
FIG. 7 shows the motor efficiency of the rotating speed relative to the torque according to the conventional motor without arc-trimming.
Figure 8:
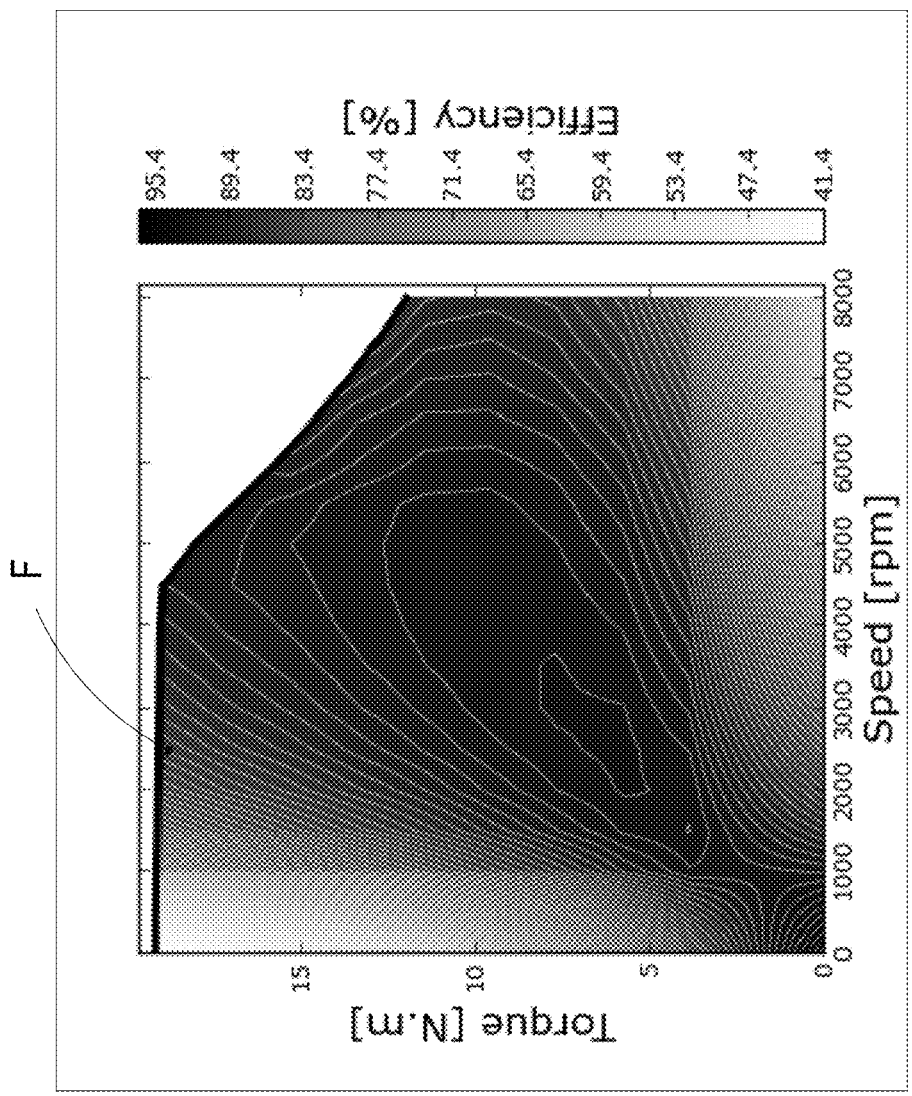
FIG. 8 shows the motor efficiency of the rotating speed relative to the torque according to the preferred embodiment of the present disclosure.

FIG. 7 shows the motor efficiency of the rotating speed relative to the torque according to the conventional motor without arc-trimming. FIG. 8 shows the motor efficiency of the rotating speed relative to the torque according to the preferred embodiment of the present disclosure. Comparing the results of FIGS. 7 and 8, it can be seen that the motor 1 of the preferred embodiment of the present invention has the advantage of maintaining the torque value at a higher rotational speed by optimizing the size and parameters of the rotor assembly 10, thereby effectively suppressing the impact of the torque ripple. In addition, the point E in FIG. 7 represents the conventional motor without arc-trimming, which is operated at a rotational speed of 2,508 rpm to obtain a torque value of 17.7 N●·m with a relative efficiency value of 79.0%. The point F in FIG. 8 represents the motor 1 of the preferred embodiment of the present invention, which is operated at a rotational speed of 2,508 rpm to obtain a torque value of 17.8 N●·m with a relative efficiency value of 86.2%. Compared with the relative efficiency value of the conventional motor without arc-trimming operated at the same conditions, the motor 1 of the preferred embodiment of the present invention further increases the relative efficiency by more than 9%, but the output torque of the motor 1 is not decreased.

On the other hand, it is noted that while the rotor assembly 10 is designed in optimization, it is beneficial to suppress the torque ripple and ensure the rotor assembly 10 to provide the optimized output torque performance. Moreover, as the output toque performance of the motor 1 is improved, it allows to shorten the magnetic component thickness of the rotor assembly 10 and reduce the input current value. Table 2 shows the differences between the conventional motor without arc-trimming and the motor 1 of the preferred embodiment of the present disclosure operated to obtain the same output toque performance.

TABLE 2

| | Motor Type | | |
| --- | --- | --- | --- |
| | Conventional motor without arc-trimming | Motor of the preferred embodiment of the present disclosure | Differences |
| Stacked thickness H (mm) | 25 | 19.8 | −20.8% |
| Torque ripple (%) | 28.57 | 5.81 | −79.6% |
| Relative efficiency operated at the same conditions | 79 | 86.2 | +9.11% |

As shown in Table 2, compared with the conventional motor without arc-trimming, the motor 1 of the preferred embodiment of the present disclosure has advantages of suppressing the torque ripple (by 79.6%) and ensuring the rotor assembly 10 to provide the optimized output torque performance (by 9.11%). It is beneficial to shorten the stacked thickness H of the rotor assembly 10. In the embodiment, the magnetic component thickness (the stacked thickness H) of the rotor assembly 10 is shorten about 21%, and the input current value is reduced. Thus, the endurance of anti-demagnetization of the output torque of motor is improved, and it achieves the effect of improving the efficiency of motor.

In summary, the present disclosure provides a rotor assembly and a motor using the same. With the rotor assembly in optimized design, the torque ripple of the motor can be effectively suppressed and the value of the torque ripple is reduced to less than 10%, so as to minimize the torque ripple in the maximum output torque range. Thus, the mutual influence of the leak flux of motor and the air-gap flux distribution/density is eliminated, and it achieves the effect of improving the efficiency of motor. Since the rotor assembly is designed in optimization, it is beneficial to suppress the torque ripple and ensure the rotor assembly to provide the optimized output torque performance. Moreover, as the output toque performance of the motor is improved, it allows to shorten the magnetic component thickness and reduce the input current value. Thus, the endurance of anti-demagnetization of the output torque of motor is improved, and it achieves the effect of improving the efficiency of motor. By optimizing the size and parameters of the rotor assembly, it simplifies the design and speeds up the development of products.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rotor assembly for a motor, wherein the rotor assembly is matched with a stator assembly, the rotor assembly and the stator assembly have a minimum air gap width value therebetween, and the rotor assembly comprises:
a plurality of magnets;
a main-body portion having a center axis and an outer peripheral edge;
a plurality of magnet-receiving slots spatially corresponding to the plurality of magnets and accommodating the plurality of magnets therein, wherein the plurality of magnet-receiving slots are disposed on the main-body portion around the central axis of the main-body portion and located through the main-body portion, wherein each of the plurality of magnet-receiving slots accommodates the corresponding magnet therein, the magnet-receiving slot has a slot width value in an outward direction extending from the central axis; and
a plurality of arc-trimming portions adjacent to the outer peripheral edge and spatially corresponding to the plurality of magnet-receiving slots, wherein each of the plurality of arc-trimming portions and a geometric symmetry center of the corresponding magnet-receiving slot together form an arc-trimming depth value, and an arc-trimming interval value is formed between the arc-trimming portion and an end of the corresponding magnet-receiving slot, wherein the arc-trimming depth value is greater than a sum value of a rate constant multiplied by the slot width value and then subtracted 2 times of the minimum air gap width value, and is less than the sum value of the rate constant multiplied by the slot width value and then plus 2 times of the minimum air gap width value, wherein the arc-trimming interval value is greater than 0.5 times of the minimum air gap width value and is less than 2 times of the minimum air gap width value.

2. The rotor assembly according to claim 1, wherein the rotor assembly has a rotor outer diameter length and the stator assembly has a stator outer diameter length, wherein a ratio of the rotor outer diameter length to the stator outer diameter length is ranged from 60% to 70%.

3. The rotor assembly according to claim 1, wherein the rate constant is greater than 0 and is less than 0.25.

4. The rotor assembly according to claim 1, wherein each of the plurality of magnet-receiving slots comprises two extending slots disposed on two opposite ends of the corresponding magnet-receiving slot, respectively, and in communication with the corresponding magnet-receiving slot.

5. The rotor assembly according to claim 4, wherein the extending slot and the corresponding magnet-receiving slot have a communication length, and the communication length is ranged from 0.6 times of the slot width value to 0.8 times of the slot width value.

6. The rotor assembly according to claim 4, wherein each of the plurality of arc-trimming portions comprises two extending portions disposed on two opposite ends of the corresponding arc-trimming portion, wherein each of the extending portions extends along the outer peripheral edge, and spatially corresponds to each of the corresponding extending slots, respectively.

7. The rotor assembly according to claim 6, wherein the extending slot has an inner edge at least partially parallel to the corresponding extending portion.

8. The rotor assembly according to claim 7, wherein the inner edge of the extending slot and the corresponding magnet received within the corresponding magnet-receiving slot have an interval width value, wherein the interval width value is ranged from 0.3 times of the slot width value to 0.5 times of the slot width value.

9. The rotor assembly according to claim 1, wherein each two of adjacent arc-trimming portions have a recess portion, and a maximum air gap width value is formed between the recess portion and the stator assembly, wherein the maximum air gap width value is ranged from 3 times of the minimum air gap width value to 5 times of the minimum air gap width value.

10. The rotor assembly according to claim 1, wherein the number of the plurality of magnet-receiving slots and the number of the plurality of magnets are 2N, wherein N is an integer, and N is greater than or equal to 2.

11. A motor comprising:
a stator assembly comprising a hollow portion; and
a rotor assembly disposed within the hollow portion and matched with the stator assembly, wherein the rotor assembly and the stator assembly have a minimum air gap width value therebetween, and the rotor assembly comprises:
 a plurality of magnets;
 a main-body portion having a center axis and an outer peripheral edge;
 a plurality of magnet-receiving slots spatially corresponding to the plurality of magnets and accommodating the plurality of magnets therein, wherein the plurality of magnet-receiving slots are disposed on the main-body portion around the central axis of the main-body portion and located through the main-body portion, wherein each of the plurality of magnet-receiving slots accommodates the corresponding magnet therein, the magnet-receiving slot has a slot width value in an outward direction extending from the central axis; and
 a plurality of arc-trimming portions adjacent to the outer peripheral edge and spatially corresponding to the plurality of magnet-receiving slots, wherein each of the plurality of arc-trimming portions and a geometric symmetry center of the corresponding magnet-receiving slot together form an arc-trimming depth value, and an arc-trimming interval value is formed between the arc-trimming portion and an end of the corresponding magnet-receiving slot, wherein the arc-trimming depth value is greater than a sum value of a rate constant multiplied by the slot width value and then subtracted 2 times of the minimum air gap width value, and is less than the sum value of the rate constant multiplied by the slot width value and then plus 2 times of the minimum air gap width value, wherein the arc-trimming interval value is greater than 0.5 times of the minimum air gap width value and is less than 2 times of the minimum air gap width value.

12. The motor according to claim 11, wherein the rotor assembly has a rotor outer diameter length and the stator assembly has a stator outer diameter length, wherein a ratio of the rotor outer diameter length to the stator outer diameter length is ranged from 60% to 70%.

13. The motor according to claim 11, wherein the rate constant is greater than 0 and is less than 0.25.

14. The motor according to claim 11, wherein each of the plurality of magnet-receiving slots comprises two extending slots disposed on two opposite ends of the corresponding magnet-receiving slot, respectively, and in communication with the corresponding magnet-receiving slot.

15. The motor according to claim 14, wherein the extending slot and the corresponding magnet-receiving slot have a communication length, and the communication length is ranged from 0.6 times of the slot width value to 0.8 times of the slot width value.

16. The motor according to claim 14, wherein each of the plurality of arc-trimming portions comprises two extending portions disposed on two opposite ends of the corresponding arc-trimming portion, wherein each of the extending portions extends along the outer peripheral edge, and spatially corresponds to each of the corresponding extending slots, respectively.

17. The motor according to claim 16, wherein the extending slot has an inner edge at least partially parallel to the corresponding extending portion.

18. The motor according to claim 17, wherein the inner edge of the extending slot and the corresponding magnet received within the corresponding magnet-receiving slot have an interval width value, wherein the interval width value is ranged from 0.3 times of the slot width value to 0.5 times of the slot width value.

19. The motor according to claim 11, wherein each two of adjacent arc-trimming portions have a recess portion, and a maximum air gap width value is formed between the recess portion and the stator assembly, wherein the maximum air gap width value is ranged from 3 times of the minimum air gap width value to 5 times of the minimum air gap width value.

20. The motor according to claim 11, wherein the number of the plurality of magnet-receiving slots and the number of the plurality of magnets are 2N, wherein N is an integer, and N is greater than or equal to 2.

* * * * *